B. HENRIKSON.
BORING MACHINE.
APPLICATION FILED APR. 13, 1912.

1,057,424.

Patented Apr. 1, 1913.
2 SHEETS—SHEET 1.

Witnesses
Martin H. Olsen
Robert Dobberman

Inventor
Bernhardt Henrikson
By Rector, Hibben, Davis & Macauley
His Attys.

E. HENRIKSON.
BORING MACHINE.
APPLICATION FILED APR. 13, 1912.
1,057,424.
Patented Apr. 1, 1913.
2 SHEETS—SHEET 2.
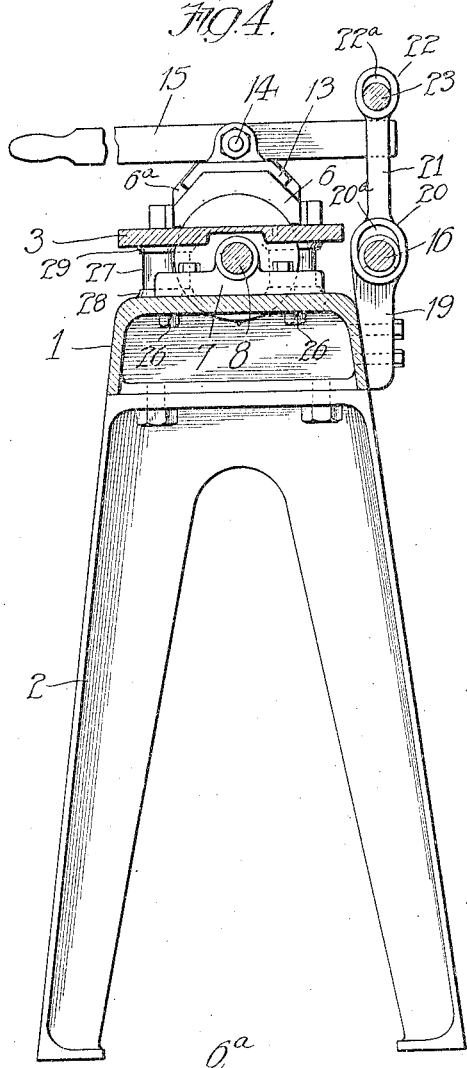
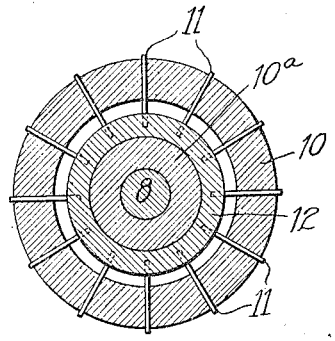
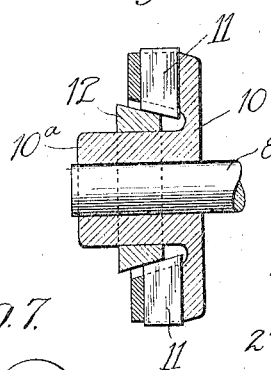
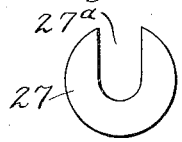
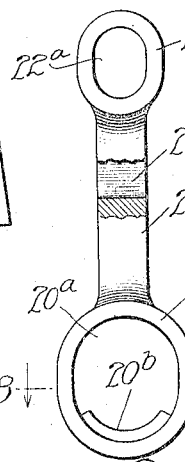
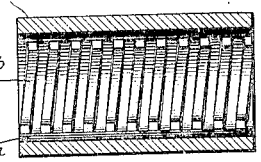
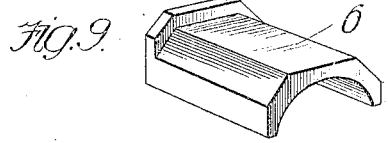
Witnesses
Martin H. Olsen
Robert Dobberman
Inventor
Bernhardt Henrikson
By Rector, Hibben, Davis & Macauley
His Attys

UNITED STATES PATENT OFFICE.

BERNHARDT HENRIKSON, OF CHICAGO, ILLINOIS.

BORING-MACHINE.

1,057,424.

Specification of Letters Patent.

Patented Apr. 1, 1913.

Application filed April 13, 1912. Serial No. 690,565.

*To all whom it may concern:*

Be it known that I, BERNHARDT HENRIKSON, a citizen of the United States, residing at Chicago, in the county of Cook and State of Illinois, have invented certain new and useful Improvements in Boring-Machines, of which the following is a specification.

My invention relates to boring machines, and the object thereof is to provide a simple, efficient and reliable machine for boring the bearing surfaces of bearings, more particularly (but not necessarily) the babbitt of bearings such as car brasses.

My machine is adapted to bore out the Babbitt metal in a simple and convenient manner and to perform the work with great accuracy.

The various features of advantage and utility in my machine will be apparent from the description hereinafter given.

Figure 1:
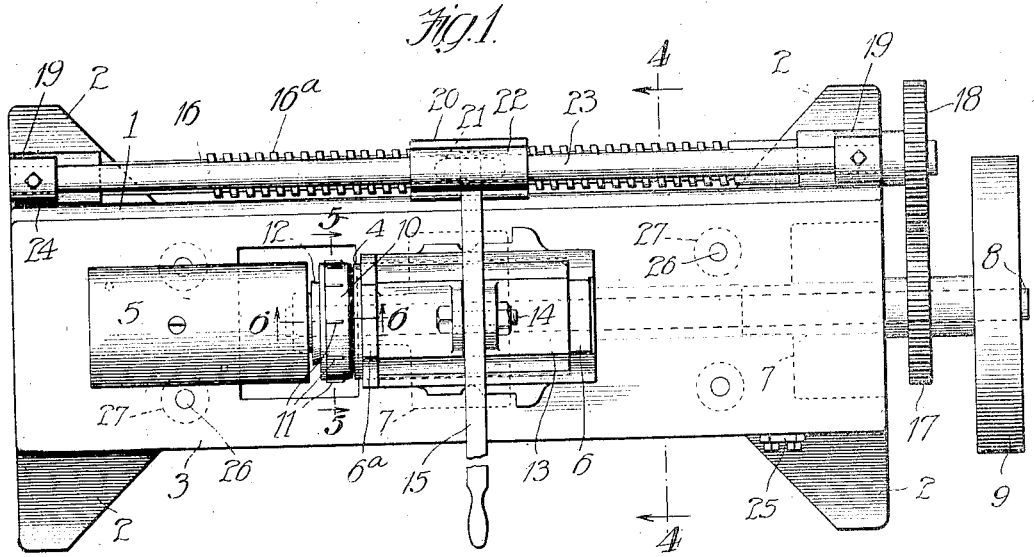
Figure 2:
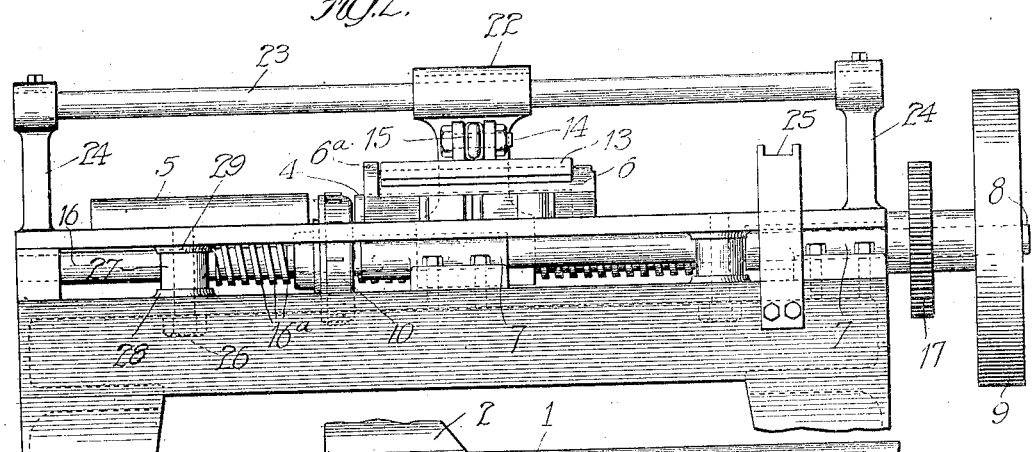
Figure 3:
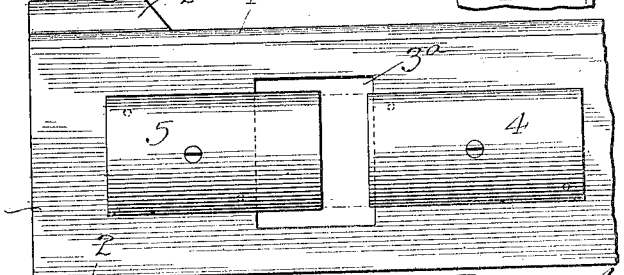

In the drawings Figure 1 is a plan view of my machine; Fig. 2 a side elevation thereof; Fig. 3 a detail plan of a portion of the machine; Fig. 4 a vertical section on the line 4—4 of Fig. 1; Fig. 5 a vertical section on the line 5—5 of Fig. 1; Fig. 6 a vertical section on the line 6—6 of Fig. 1; Fig. 7 an elevation of one of the operating connections of the machine; Fig. 8 a section on the line 8—8 of Fig. 7; Fig. 9 a perspective view of a car brass; and Fig. 10 a detail view of one of the adjusting washers or collars.

In the present instance I have, for the sake of a clear and definite disclosure of my invention shown the same as embodied in a machine constructed and arranged to bore out car brasses used in journal boxes of railway cars but it will be understood that my invention is not to be limited to such particular use but that by modifying the form of several of the parts of the machine, it may be as well used for boring out other kinds of bearings. Referring to the particular machine illustrated in the drawings the same is provided with a bed plate 1 supported by legs 2 and a plate 3 supported above such bed plate and arranged in a horizontal plane. Upon the face of this plate 3 are secured in longitudinal alinement two forms or pads 4 and 5, which are similar to each other with the exception that the pad 5 is the larger to the extent of the cut made by the cutter as hereinafter described. These pads are stationary and partake of the form of the bearing face of the bearing which is here shown as a car brass indicated at 6.

In suitable bearings 7 and below the plate 3 is arranged the cutter arbor or shaft 8 extending longitudinally of the machine. This shaft is driven in any suitable manner as by means of the pulley 9. To this shaft is secured a cutter device comprising a head 10 provided with the series of radial slots in which the cutters 11 are mounted, and an adjusting wedge-shaped collar 12 encircling the hub portion 10$^a$ of the cutter head and adapted to engage the inner ends of the cutters to determine the amount of outward projection of such cutters and to thereby determine the depth of cut in the boring operation, Figs. 5 and 6. As shown in Figs. 1 and 2 this cutter is arranged between the two pads 4 and 5 and in an opening 3$^a$ in the plate 3. Moreover, the axis of this cutter is in the same vertical plane as the longitudinal axes of the two pads 4 and 5. Initially, the car brass is placed upon the pad 4 and is fed to the left, Figs. 1, 2 and 3, over the cutter and upon the other pad 5. The means for holding the car brass during this boring operation and for so feeding the same, consists of a plate 13 whose under surface, in this particular instance, corresponds with the top surface of the car brass. This plate is pivotally connected at 14 to a swinging hand-operated lever 15 which is adapted to be grasped and operated by the attendant. This lever is arranged to be moved in a horizontal direction from right to left so as to feed the car brass in the manner already outlined, and in the present instance the means for so feeding the lever are adapted to be brought into operation only when the lever is in its operative position, that is, when its plate 13 is pressed upon the work.

Describing the operating means herein shown, the same includes a driving shaft 16 which runs constantly as long as the cutter is rotated, in view of the intermeshing driving gears 17 and 18 on the shafts 8 and 16 respectively. This driving shaft 16 is mounted in suitable bearing brackets 19 on the main frame and is in the form of a screw shaft with the screw threads 16$^a$ intermediate its length. Coöperating with this screw shaft is a nut 20 of the peculiar form clearly shown in Figs. 7 and 8, such nut having an enlarged opening 20$^a$ receiving the screw shaft and also having at the lower side of such opening screw threads 20ᵇ which are adapted to engage the corresponding screw threads of the shaft 16. This nut is provided with an arm 21 having intermediate its length and toward its upper end a slot 21ᵃ adapted to receive an end of the lever 15. This arm terminates at its upper end in a sleeve 22 having an opening 22ᵃ which is elongated in a vertical direction. This nut, arm and sleeve are in the present instance made in a single piece and the same constitutes an operating link or connection between the lever 15 and the driving shaft 16. The sleeve 22 fits over a guide rod or shaft 23 extending horizontally above and parallel with the drive shaft 16, the ends of the same being secured to the posts 24 rising from the frame of the machine.

The operation of my machine when used for the boring of car brasses as herein shown is as follows: The car brass is placed upon the pad 4 and the lever 15, which has heretofore been supported by the rest 25 near one end of the machine, is, together with its plate or carrier 13, brought to a position directly over the car brass. It will be understood that when the lever 15 is in its inactive position on the rest 25, the connecting link, comprising the parts 20, 21 and 22, is in its lowermost position with the nut 20 out of operative relationship with the screw shaft 16. However, when the lever and its carrier or plate 13 are brought to the described operative position, with the operator pressing downwardly with some force, the nut 20 is raised upwardly by the pivotal action of the lever 15 to a position of engagement with the screw shaft, with the result that the connecting link, lever 15 and its carrier will be fed to the left, Figs. 1, 2 and 3. In this particular instance the left-hand edge of the plate 15 will engage the usual flange portion 6ᵃ of the car brass which will thereby be fed positively to and over the cutter, during which operation the attendant or operator presses down upon the outer or free end of the lever 15. The inside or bearing surface of the car brass fits rather accurately upon the pad 4 and after it has been bored out by the cutter it will be fed along over the other pad 5 which will accurately fit such bearing after being bored, such pad 5 being larger than the pad 4 to the extent of the cut. After the bearing has been fed entirely past the cutter the operator swings the lever 15 upwardly thereby lowering the link connection and disconnecting the latter from the screw shaft, at which time such link will be supported by the guide rod 23 and the operator can then easily and freely slide said parts back to the right to initial position for a repetition of the operation described. The two pads 4 and 5 are removable from the top plate in order that forms or pads of other sizes or shapes may be substituted according to the particular character of bearing being operated upon, and likewise the plate 13 is made removable from the lever 15 in order that other sizes or shapes of plate may be substituted, according to the work or bearing being operated upon. I prefer the replacement or substitution of pads according to the shape and size of the particular bearings being operated upon but some range of adjustment may be secured by raising or lowering the top plate 3, which adjustment may be provided for in the following manner. The plate 3 is mounted upon and spaced above the plate 1 by means of the bolts 26 and the collars or washers 27 which are interposed between the bosses 28 and 29 on the plates 1 and 3 respectively, the bolts 26 passing through the collars and the said bosses as shown in Figs. 2 and 4. These collars are made in sets of different sizes or heights with the result that any desired degree of spacing between the two plates 1 and 3 may be secured by inserting a set of collars of the desired height. In order to facilitate the removal and insertion of these collars each is provided with a side opening or slot 27ᵃ, as clearly shown in Fig. 10. The effect of raising or lowering the top plate has the effect of correspondingly raising or lowering the pads 4 and 5.

My machine is comparatively simple and easy to operate, besides which the bearings are bored with great uniformity and accuracy, requiring no further operation or even finishing before being put into actual use.

I claim:

1. In a machine of the class described, the combination of a stationary form or pad upon which the work is initially placed and upon which it fits, a cutter arranged at one side of the pad, and means for feeding the work from the pad and into operative relationship with the cutter.

2. In a machine of the class described, the combination of a stationary form or pad upon which the work is initially placed and upon which it fits, a cutter arranged at one side of the pad, a second pad arranged at the other side of the cutter and larger than the first pad to the extent of the amount of cut of said cutter, and means for feeding the work from the first to the second pad and into operative relationship with the cutter.

3. In a machine of the class described, the combination of a stationary form or pad upon which the work is initially placed and upon which it fits, a cutter arranged at one side of the pad, a carrier adapted to fit upon and engage the work, and means for actuating the carrier for feeding the work, from the pad and into operative relationship with the cutter.

4. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, and means for moving the lever transversely of its longitudinal axis.

5. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, said plate being pivotally connected with the lever, and means for moving such lever transversely of its longitudinal axis.

6. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a driving shaft, and means for operatively connecting and disconnecting said lever to and from the shaft.

7. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a driving shaft, and means for operatively connecting the lever with the shaft when the plate and lever are in operative relationship and for disconnecting them when such plate and lever are not in such operative relationship.

8. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a driving shaft, and a link which is adapted to be operatively connected with both the lever and the shaft but which is normally disconnected from the shaft.

9. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a driving shaft, and a link slotted at its upper end to receive an end of the lever and slotted at its lower end to receive the shaft, said link being arranged to operatively engage the shaft when the lever is in operative position.

10. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a constantly running driving shaft, and an operating connection at all times connected with the lever and normally disconnected from the shaft but constructed and arranged to be connected with the shaft when the lever is brought to perative position.

11. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a screw shaft and an operating connection between such shaft and lever comprising a nut having an elongated opening one side of which is screw threaded to engage the screw threads of the shaft, and having an arm which is operatively connected with the lever.

12. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a screw shaft and an operating connection between such shaft and lever comprising a nut having an elongated opening one side of which is screw threaded to engage the screw threads of the shaft and having an arm which is slotted at its free end to receive an end of the lever, whereby when the latter is moved to press the plate on the work the nut is brought into operative relationship with the shaft and the work thereby moved over the cutter.

13. In a machine of the class described, the combination of a stationary form or pad upon which the work is initially placed and upon which it fits, a cutter arranged at one side of the pad, a plate adapted to fit upon and engage the work for feeding the latter from the pad and into perative relationship with the cutter, a swinging lever adapted to coöperate with the plate to cause the latter to press the work upon the pad and to move such plate for feeding purposes, a screw shaft and an operating connection between such shaft and lever comprising a nut having an elongated opening one side of which is screw threaded to engage the screw threads of the shaft, and a guide rod on which said arm travels.

14. In a machine of the class described, the combination of a stationary form or pad upon which the work is initially placed and upon which it fits, a cutter arranged at one side of the pad, a plate adapted to fit upon and engage the work for feeding the latter from the pad and into operative relationship with the cutter, a swinging lever adapted to coöperate with the plate to cause the latter to press the work upon the pad and to move such plate for feeding purposes, a screw shaft and an operating connection between such shaft and lever comprising a nut having an elongated opening one side of which is screw threaded to engage the screw threads of the shaft, the upper end of said arm being formed as a sleeve with an elongated opening and a guide rod on which said sleeve travels.

15. In a machine of the class described, the combination of a stationary form or pad upon which the work is initially placed and upon which it fits, a cutter arranged at one side of the pad, means for feeding the work from the pad and into operative relationship with the cutter, a bed plate, a top plate to which said pad is removably secured, and means for holding such top plate above the bed plate including bolts and removable collars interposed between the two plates.

16. In a machine of the class described, the combination of a stationary form or pad upon which the work is initially placed and upon which it fits, a cutter arranged at one side of the pad, means for feeding the work from the pad and into operative relationship with the cutter, a bed plate, a top plate to which said pad is removably secured, and means for holding such top plate above the bed plate including bolts and removable collars interposed between the two plates, the bolts passing through the collars and the latter having side openings.

BERNHARDT HENRIKSON.

Witnesses:
S. E. HIBBEN,
ROBERT DOBBERMAN.

Copies of this patent may be obtained for five cents each, by addressing the "Commissioner of Patents, Washington, D. C."